April 2, 1968  J. W. SHERWOOD ET AL  3,375,657
ROTARY GAS TURBINE ENGINE
Filed Sept. 6, 1966  6 Sheets-Sheet 2
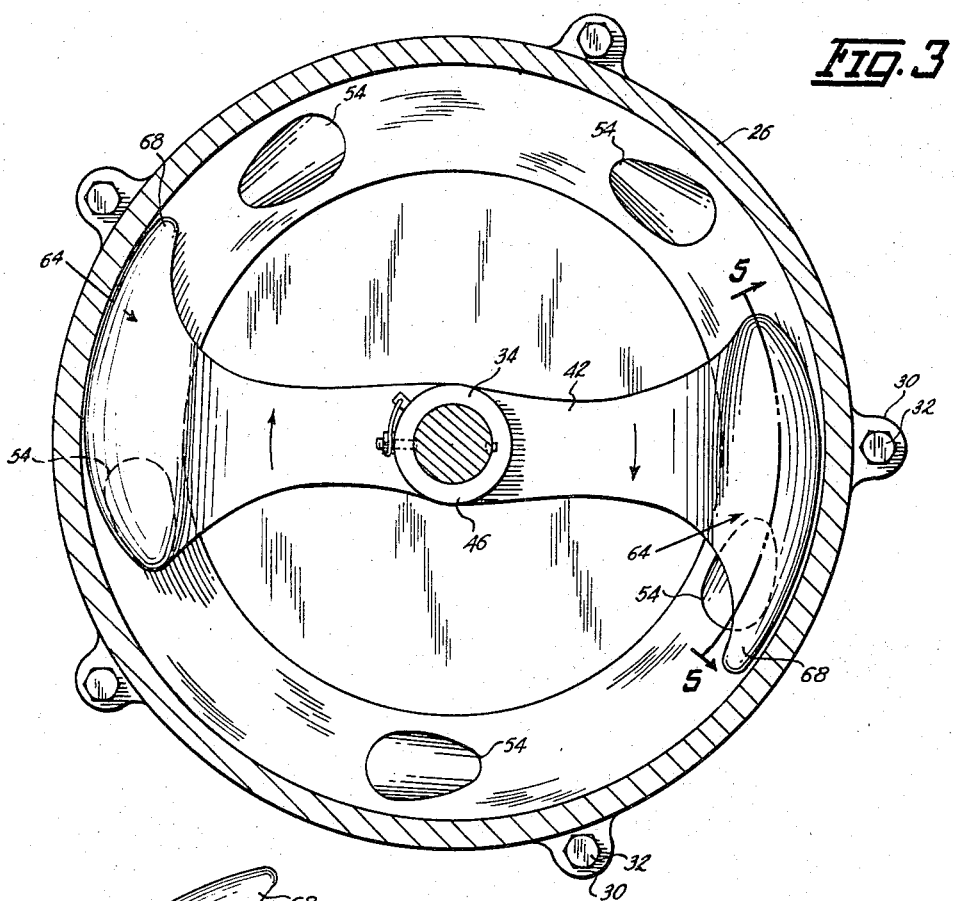
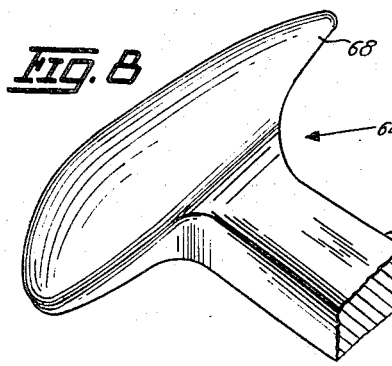
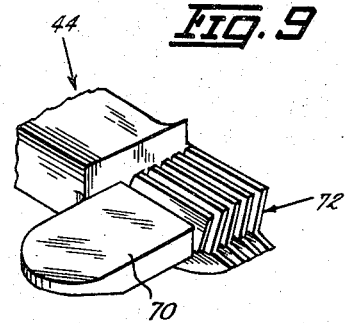
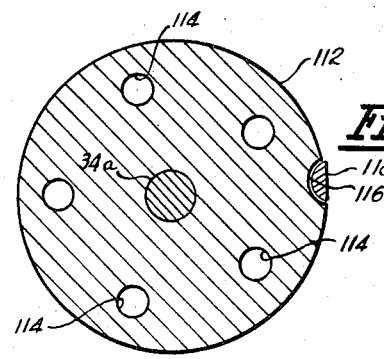
INVENTORS.
JOHN W. SHERWOOD
JOHN W. SHERWOOD, III
BY Morton S. Adler
ATTORNEY.

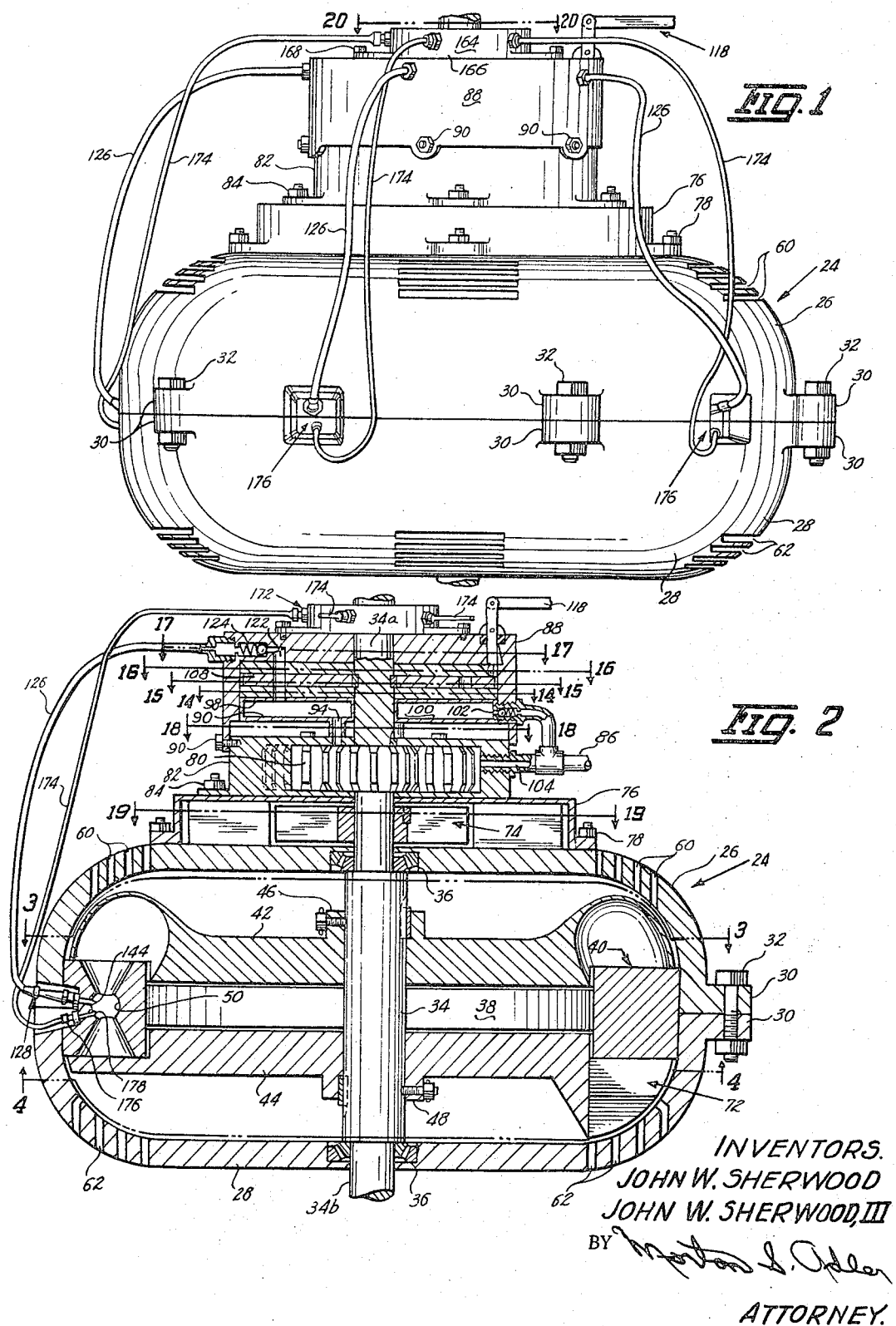

INVENTORS.
JOHN W. SHERWOOD
JOHN W. SHERWOOD, III
BY Morton S. Adler
ATTORNEY.

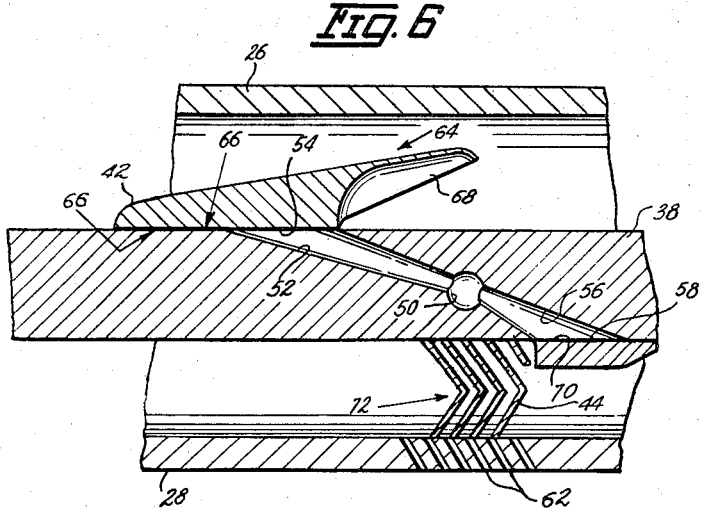
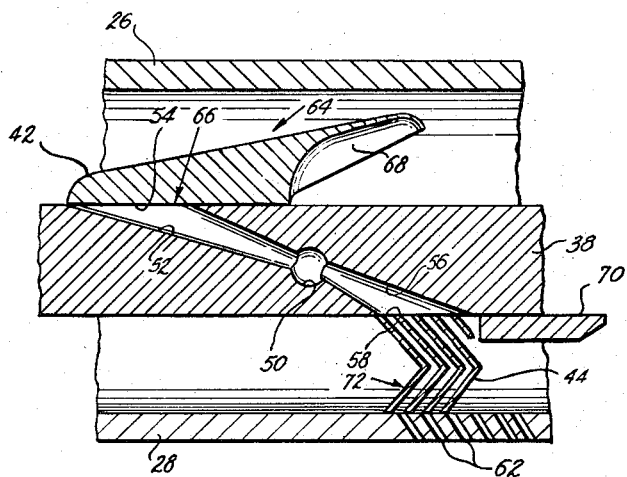
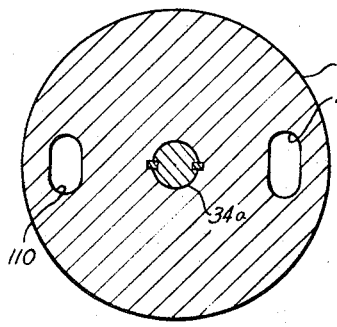
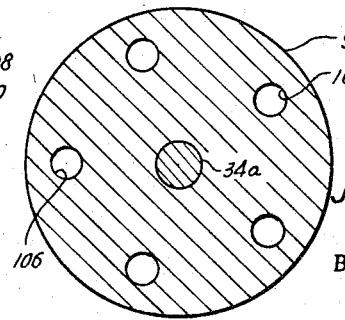
INVENTORS.
JOHN W. SHERWOOD
JOHN W. SHERWOOD, III

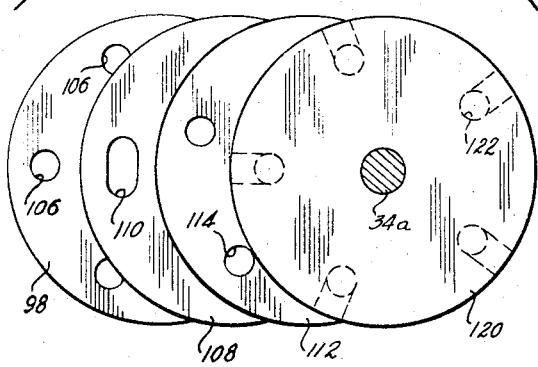
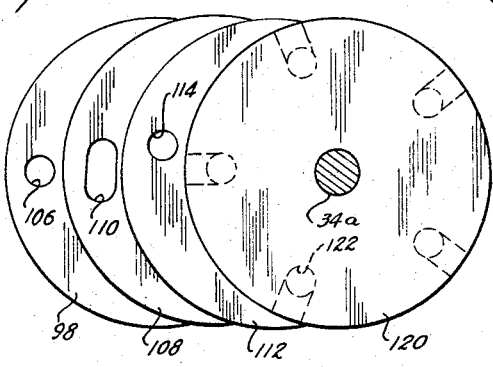
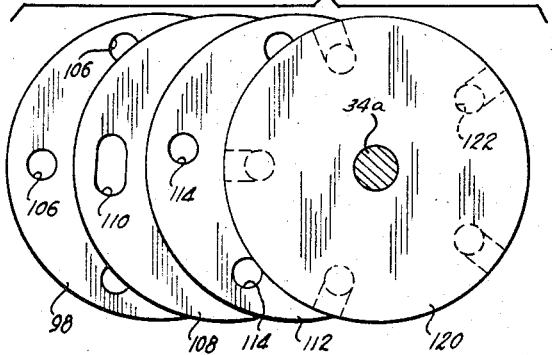
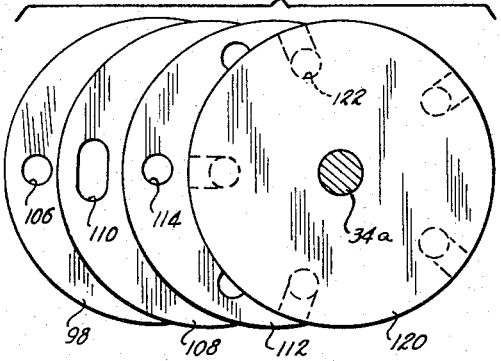
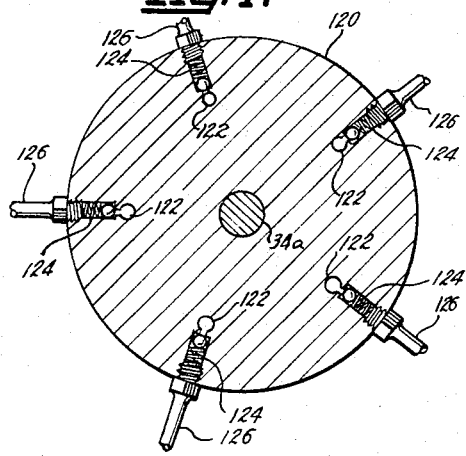
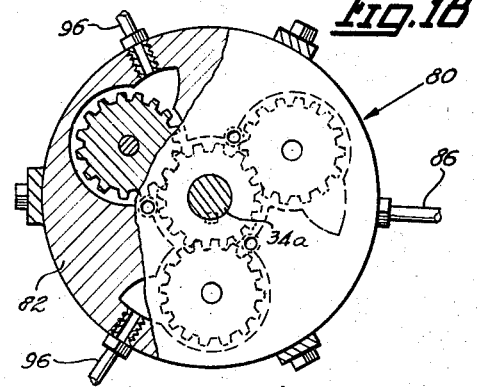
INVENTORS.
JOHN W. SHERWOOD
JOHN W. SHERWOOD, III
BY
ATTORNEY.

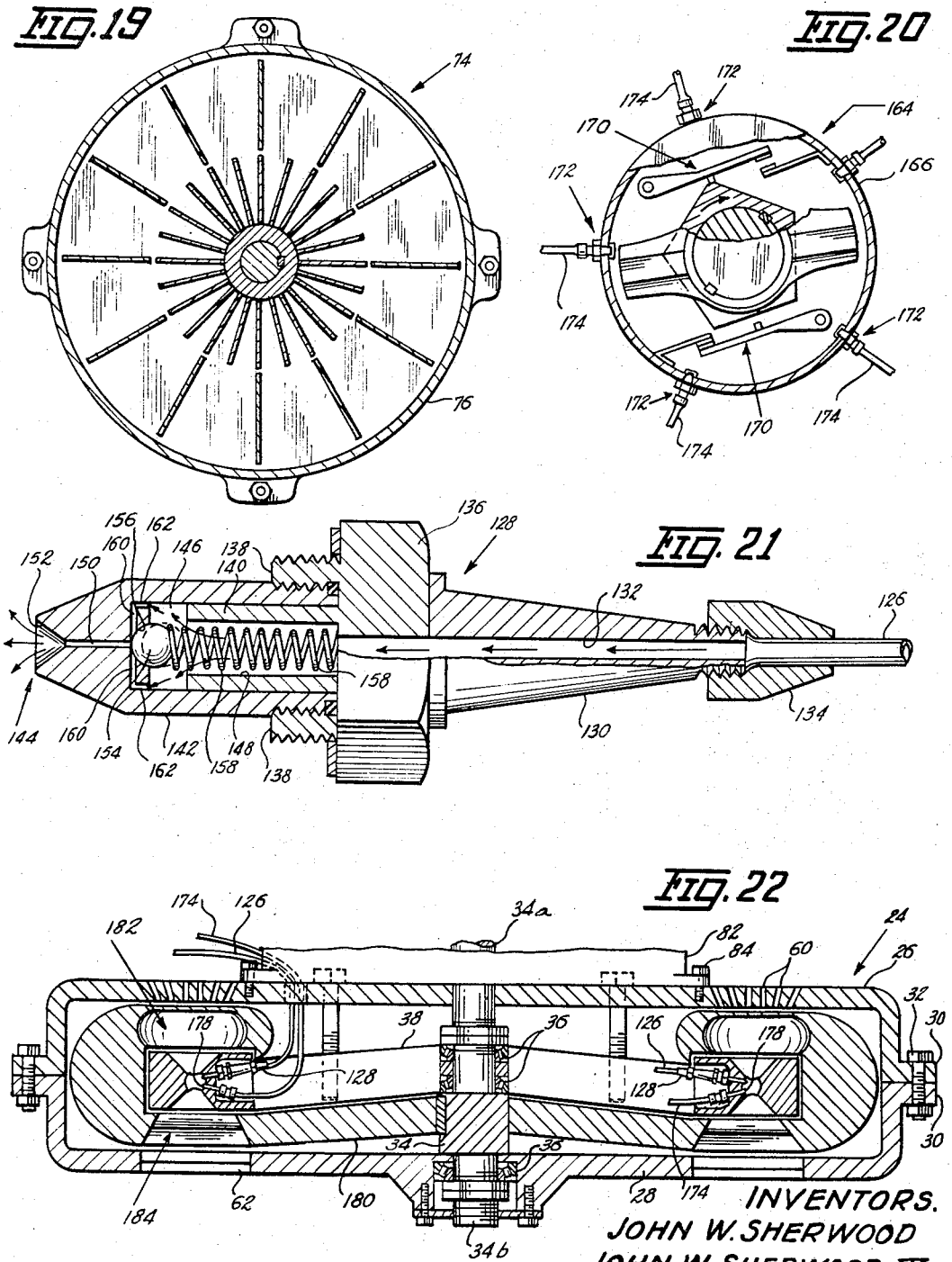

United States Patent Office 3,375,657
Patented Apr. 2, 1968

3,375,657
ROTARY GAS TURBINE ENGINE
John W. Sherwood, 806 Pine St., Atlantic, Iowa 50022, and John W. Sherwood III, Rte. 3, Box 158, Guthrie Center, Iowa 50115
Filed Sept. 6, 1966, Ser. No. 577,293
11 Claims. (Cl. 60—39.81)

This invention relates to improvements in rotary internal combustion engines and one of the important objectives contemplated herein is the provision of a new and improved engine of this type that is relatively light in weight, has a minimum of moving parts and is highly efficient in operation.

More specifically, this invention contemplates a fixed solid ring substantially rectangular in cross section, and encircling a drive shaft with the ring provided with a plurality of internal power cells or combustion chambers, each of which communicates with an air intake port on one side of the ring and an exhaust port on another side of the ring. Rotating members connected to the drive shaft pass respectively over either opposed or adjacent sides of said ring and said ports and relative to the direction of rotation, the exhaust ports are off-set in a leading direction relative to the intake ports. The rotating members are synchronized so that air is scooped into the intake ports at which time the exhaust port is being closed and subsequently both ports are closed to compress the air in the power cell. At the maximum compression, fuel is injected and ignited in the power cell with the intake port remaining temporarily closed and the exhaust port opening. Vanes or fins at the exhaust port transmit a power thrust through the rotating member to the drive shaft. The power cells are so spaced that they are fired in rapid succession and provide a steady and even source of power to the drive shaft at an extremely high r.p.m.

A further object herein is to provide a novel engine as characterized above which requires no carburation or mixing of fuels.

A still further object is to provide an improved fuel delivery control system for fuel injection into the power cells.

Still another object is to provide an improved fuel atomizing device for use with the fuel injection apparatus.

An additional object is to provide an engine of the above class which is easily susceptible to being connected to like engines in a battery arrangement to provide increased power and operation efficiency.

A further object contemplates the provision of a new rotary engine as set forth above which is air cooled.

A still further object is to provide an improved and highly efficient engine that is extremely economical to manufacture and in which a minimum of machined parts is required so that the greater portion of the parts necessary may be fabricated by stamping methods.

To attain these objects and such further objects as may appear herein, or be hereinafter pointed out, reference is made to the accompanying drawings forming a part hereof, in which:

FIG. 1 is an elevational view showing a preferred embodiment of this engine,

FIG. 2 is a cross sectional view of the entire engine shown in FIG. 1,

Figure 4:
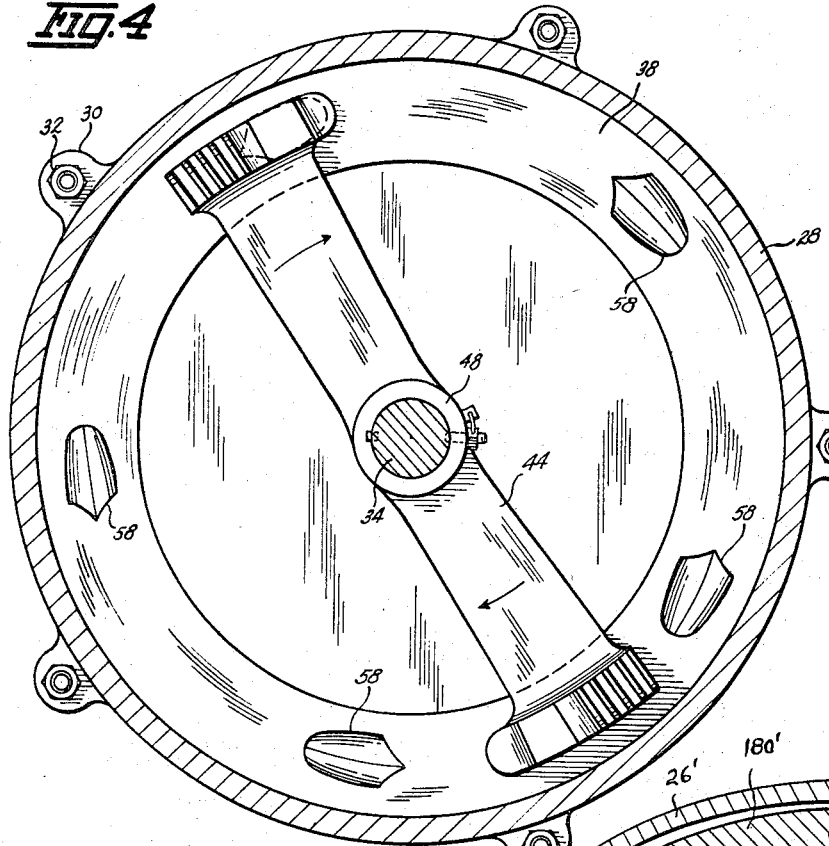
Figure 23:
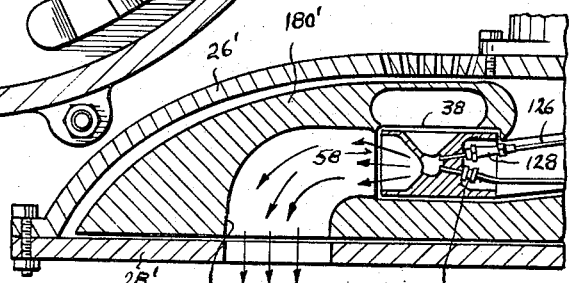
Figure 5:
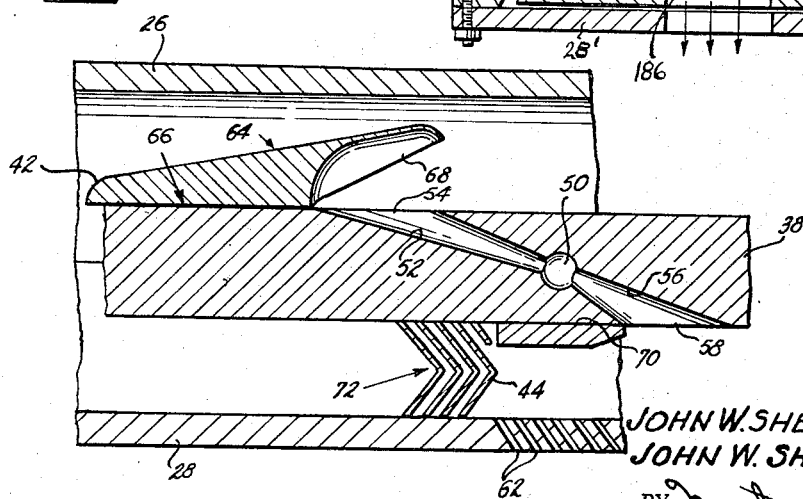

FIG. 3 is a cross sectional view of the rotatable air receiving or compressor upper arm taken on the line 3—3 of FIG. 2, FIG. 4 is a cross sectional view of the rotatable power lower arm taken on the line 4—4 of FIG. 2, FIG. 5 is a cross sectional view taken on the line 5—5 of FIG. 3 showing both the intake and exhaust ports in the ring intermediate the two arms in open position, FIG. 6 is similar to FIG. 5 but showing the position of the ports following that shown in FIG. 5 where both ports are closed for ignition and combustion of fuel, FIG. 7 is similar to FIGS. 5 and 6 and shows the intake port closed and the exhaust port open which produces the power thrust following the sequence shown in FIGS. 5 and 6, FIG. 8 is an enlarged perspective view of one end portion of the upper arm, FIG. 9 is an enlarged perspective view of one end portion of the lower arm, FIGS. 10–13 are respective exploded views of the fuel delivery mechanism wherein FIG. 10 shows the fuel line closed; FIG. 11 shows it partly open; FIG. 12 shows it half open, and FIG. 13 shows it fully open, FIG. 14 is a cross sectional view of one of the disc plates in the fuel delivery mechanism taken on the line 14—14 of FIG. 2, FIG. 15 is a cross sectional view of another disc plate in the fuel delivery system taken on the line 15—15 of FIG. 2, FIG. 16 is similar to FIGS. 14 and 15 but taken on the line 16—16 of FIG. 2, FIG. 17 is a cross sectional view showing the fuel line input valves taken on the line 17—17 of FIG. 2, FIG. 18 is a cross sectional view of a high pressure fuel pump taken on the line 18—18 of FIG. 2, FIG. 19 is a cross sectional view of the generator and starter used with this engine and taken on the line 19—19 of FIG. 2, FIG. 20 is a top view, partly broken away, of the ignition distributor apparatus taken from the line 20—20 of FIG. 1, FIG. 21 is an enlarged longitudinal sectional view of the fuel atomizing valve used with this engine, FIG. 22 is a sectional view of a modified form of this engine in which the arms of FIGS. 3 and 4 are replaced by a single arm structure which perform the same function, and FIG. 23 is a further modified view of FIG. 22 to illustrate the exhaust port in the ring on an adjacent side relative to the intake port as distinguished from an opposed side.

Referring to the drawings, a casing or housing 24 (FIGS. 1–2) includes the complementary upper shell portion 26 and the lower shell portion 28 of each of which are provided with peripheral projecting registrable apertured ears 30—30 whereby such shells can be removably secured together by the bolts and nuts 32. A shaft 34 is mounted to housing 24 for rotation in bearings 36—36 so as to project perpendicularly from both shell portions 26 and 28. That portion of shaft 34 projecting from shell 26 is designated 34a and is associated with certain other operating mechanism that will later be described in detail, and that portion projecting from shell portion 28 is designated 34b as seen in FIG. 2. Shaft portions 34a and 34b which project from housing 24 are intended to be suitably coupled with any machine or device to be driven by the power supplied by this engine and may also be coupled to corresponding shafts on like engine units whereby a battery of these engines may be combined if desired.

A ring member 38 of a suitable light weight solid material is immovably secured within housing 24 (FIG. 4) and is substantially square in cross section as best seen at 40 in FIG. 2. Also mounted within housing 24 are two elongated rotating arms 42 and 44 which are secured at their center portion to shaft 34 for rotation therewith by the respective bearings 46 and 48 whereby the outer ends of arm 42 rotate clockwise across one side of ring 38 as seen in FIGS. 2 and 3 and the outer ends of arm 44 rotate similarly relative to the opposite sides of ring 38 as seen in FIGS. 2 and 4. The ends of such arms are specially constructed and will be more fully described as this description proceeds.

The interior of ring 38 is provided with a plurality of equally spaced combustion chambers or cells 50 (FIGS. 5–7) and each cell 50 communicates with a diagonal intake passageway 52 terminating in an intake port 54 on one side of ring 38 and with a diagonal exhaust passageway 56 terminating in an exhaust port 58 on the opposite side of ring 38. For purposes of description only, the intake port side of ring 38 may be referred to as the top side and the exhaust port side as the bottom in view of the relative position of the drawings as for example in FIGS. 2–7 but it will be understood that in the actual operating position of this engine these ports may be differently located.

As seen in FIGS. 3 and 4 we have illustrated an odd number of five intake and exhaust ports 54 and 58 with each arm, 42 and 44 having two oppositely disposed, or an even number, of arm portions extending radially from their axis. An even number of ports and cells may be used by providing an odd number of arm extensions on members 42 and 44.

With reference to FIGS. 5–7, it is pointed out that relative to a perpendicular line through ring 38 and any of the cells 50, the respective intake port 54 is off-set counterclockwise and the respective exhaust port is off-set clockwise and this is the reason for the diagonal arrangement of passageways 52 and 56. It is also noted that such passageways are progressively wider from the cell 50 to the respective intake and exhaust ports.

Thus far described it will be understood that the end portion of arm 42 will pass over the intake ports 54 and the end portions of 44 will pass over the exhaust ports 58 as they rotate in a clockwise direction. Arm 42 can be designated as the air receiving or compressor arm and arm 44 as the power arm since the general function of these arms, which will later be described in full detail, is to scoop air into passageway 52, trap it and compress it in cell 50 where fuel and ignition is provided as will appear and exhaust it against arm 44 which will supply rotating power to shaft 34. In this regard, housing shell 26 is provided with a plurality of spaced air intake vents or louvres 60 arranged to register with the intake ports 54 and shell portion 28 is provided with similar vents or fins 62 to register with the exhaust ports 58.

The outer ends of the air intake arm 42 define an air scoop member 64 as best seen in FIGS. 3–8 which includes the flat side 66 that progressively passes over the intake port 54 to progressively close it to full closure and then progressively open it, and a leading arcuate air scoop or fin 68 is designed to collect as much air as possible for movement into the intake passageway 52. In this regard as seen in FIG. 3, the intake ports 54 are generally egg shaped in cross section with the smaller end oriented toward the direction from which such port will first be approached by member 64.

The outer end of the power arm 44 is best seen in FIG. 9 where the flat surface portion 70 passes across the exhaust port 58 to progressively close it to full closure and then progressively open it as the plurality of vanes or fins 72 come into register with such port. Fins 72 provide a plurality of passageways through the end portion of arm 44 which, when such fins are in registration with port 58, they are also in registration with the air vents 62 in shell portion 26. It will be noted that fins 72 are V-shaped which add to the thrust on arm 44 to impart a rotary motion thereto as will later be referred to in more detail.

The means for actuating arms 42 and 44 is contained in the superstructure mounted to shell portion 26 as best seen in FIGS. 1 and 2 and includes generally an electric generator and starter assembly 74 of any suitable type mounted in a well known manner to shaft portion 34a and enclosed in a housing 76 that is attached to shell 26 by the bolts and nuts 78. Above the generator and starter assembly 74 there is mounted a high pressure fuel pump 80 of any well known construction as illustrated more clearly in FIG. 18. Pump 80 is contained with the housing 82 mounted to the top of housing 76 by the nuts and bolts 84 and includes the fuel intake line 86 adopted to extend to a source of supply. Pump 80 is keyed to shaft portion 34a for rotation therewith in a well known manner.

Above housing 82 is the top housing or casing 88 fitted over housing 82 and secured thereto by the bolts and nuts 90 as best seen in FIGS. 1 and 2 where it is also seen that it includes parts associated with shaft portion 34a. Casing 88 includes a bottom 92 that is provided with a passageway 94 for receiving fuel from the outlet line 96 of pump 80. Mounted in spaced relationship above the casing bottom 92 is a disc plate 98 with such plate being a part of our fuel delivery and control system, such plate and others associated therewith being further illustrated in FIGS. 10–16. Plate 98 in cooperation with bottom 92 serves as the top of a high pressure fuel chamber 100 which initially receives fuel from pump 80. One end of chamber 100 is provided with a suitable spring loaded relief valve 102 connecting to a by-pass or return fuel line 104 back to line 86 in the event that pressure in chamber 100 gets too high.

Plate 98 as seen in FIG. 14 is provided with a plurality of spaced holes 106 each similarly radially spaced from the axis of the plate and the number of such holes, shown as five, corresponds to the number of cells 50 that are present in ring 38 previously described. If more or less cells 50 are in ring 38, plate 98 will have a corresponding number. Thus far described, it will be understood that since plate 98 is the top of the pressure chamber 100, fuel will be forced through any of the holes 106 that may be open as will later appear. In juxtaposition on plate 98, is the disc plate 108 as shown in FIG. 15 which is provided with the diametrically opposed oblong holes or openings 110 relative to its axis. Plate 108 is keyed to shaft portion 34a for rotation therewith and openings 110 are designed to register with openings 106 on plate 98 in a predetermined arrangement as will later appear, such arrangement being synchronized with the movement of arms 42 and 44 relative to ports 54 and 58 which will be further described in the operation of this engine.

In juxtaposition above plate 108 is our fuel control disc plate 112 which as seen in FIG. 16 is substantially the same as plate 98. (FIG. 14) having similarly arranged holes 114 but being provided with the peripheral notch 116. Plate 112 is engageable at notch 116 by a suitable manually operable lever assembly 118 on casing 88 whereby such plate can be slightly rotated so that holes 114 are only in partial register with holes 106 in plate 98 or completely out of register therewith as seen in the sequence of FIGS. 10–13 and as more particularly referred to in the description of these figures. The inside top portion of the casing 88 defines what appears in FIGS. 10–13 as plate 120 and as shown more in detail in FIG. 17 has a plurality of fuel receiving chambers 122 corresponding in number to the number of cells 50 and likewise the number of holes in plates 98 and 112 with which they are in registration. The respective chambers 122 register with the respective holes 106 in plate 98. Each chamber 122 connects through a spring loaded ball check valve 124 to a fuel line 126 for delivery of fuel to a fuel injection assembly 128 associated with each cell 50 as follows.

The fuel injection assembly 128 as best seen in FIG. 21 is in effect a nozzle unit having the rear tapered portion 130 provided with the bore of fuel passageway 132. One end of portion 130 is externally threaded to receive a fitting 134 attached to fuel line 126 and the other end of portion 130 terminates in a hex-nut like body 136 from which there projects the collar 138 that is threaded both internally and externally as shown and the cylindrical sleeve 140. A nozzle head 42 is fitted over sleeve 140, is secured to the internal threads of collar 138 and the entire assembly 128 is suitably attached to housing 24 by the external threads on collar 138 so that the discharge end 144 of nozzle head 142 is disposed within cell 50 (FIG. 2) and it will be understood that there is a like ignitor assembly 128 for each cell 50. Nozzle body 142 is hollow and by reason of its mounting to sleeve 140 as seen in FIG. 21, the interior of such head defines a fuel atomizing chamber 146, and a fuel passageway 148 that is concentrically larger than and in communication with passageway 132 which extends through the hex body 136. The discharge end 144 of nozzle head 142 is provided with a reduced fuel discharge passageway 150 that comunicates at one end in chamber 146 and terminates at the other end in the diverging discharge opening 152. A ball valve 154 in chamber 146 is normally seated across passageway 150 in seat 156 to close it and is yieldingly held in this position by spring 158 which extends into passageway 148 and abuts the hex body 136 on one end and ball 154 on the other as shown. The bottom of seat 156 is provided the fuel passageways 160—160 which are perpendicular to and communicate with passageway 150 at a point just below ball valve 154 and such passageways 160—160 communicate with the further passageways 162—162 that terminate in chamber 146. Thus arranged, passageways 162 and 160 provide a means for fuel under pressure to act against the bottom of ball valve 154 to move it against spring 158 sufficiently to open passageday 150. This restriction in the movement of the fuel has the effect of atomizing it for discharge into cell 50 as will later appear.

Referring now FIGS. 1 and 20, an ignition distributor assembly 164 is mounted in a housing 166 to the top of housing 88 by the bolts and nuts 168. Assembly 164 may be of any well known type and as shown is one which preferably uses two sets of points 170—170 and includes a plurality of terminals 172 corresponding to the number of cells 50. Each terminal 172 connects by a respective lead line 174 to a fitting 176 for holding a spark plug 178 that is mounted in any suitable manner so that the firing end of the plug is disposed within a cell 50 as seen in FIG. 2.

*Operation*

To start the operation of this engine, the starter 74 will be actuated in a well known manner by any suitable switch (not shown) so that arms 42 and 44 will begin to rotate relative to ring 38 as described above. In general, as these arms rotate, air will be scooped and forced into the intake passageway 52 of the ring 38 with the relative positions of the arms as shown in FIG. 5 and such air is then trapped in the cell 50 when both the intake port 54 and the exhaust port 58 are closed as seen in FIG. 6. At this point a combustible fuel is delivered to the cell and ignited whereby the results of that combustion are exhausted through port 58 against the bottom arm 44 to impart a rotary motion to shaft 34. In the exhaust process, port 54 is closed with port 58 open as seen in FIG. 7.

In the above general operation as indicated, the injection of fuel into cell 50 through the fuel injection assembly 128 is designed to operate when arms 42 and 44 are in the position relative to cell 50 shown in FIG. 6 and likewise the ignition distributor assembly 164 is designed to operate the respective spark plugs 178 within the respective cell 50 simultaneously with the discharge of fuel from the fuel injector assembly 128.

The regulation of fuel distribution to this engine is controlled by the operation of lever means 118 which will partially rotate plate 112 shown in the sequence of FIGS. 10-13. In this regard, it will be understood that plate 98 serves as the top of the fuel pressure chamber 100 so that fuel under pressure can pass through any one of the openings 106 in plate 98 that is not closed. Plate 108, which rotates with shaft 34 will alternately open and close holes 106 in plate 98 in a predetermined sequence so that the particular hole 106 which will be associated with one of the cells 50 when its respective intake and exhaust ports are closed as shown in FIG. 6 will be in a position to deliver fuel to that cell. The amount of fuel, if any, which will be delivered will depend upon the location of plate 112. If plate 112 is in the position shown in FIG. 10, the hole 114 therein will be out of registration with hole 106 in plate 98 and with hole 110 in plate 108 so that in effect the fuel supply line to the particular cell involved is closed. When plate 112 is moved to the position shown in FIG. 11, it will be seen that hole 114 is in partial registration with holes 110 and 106 so that a small amount of fuel can reach the particular fuel chamber 122 associated with their respective cells 50 and the engine will correspondingly operate at slow speed. With plate 112 arranged as shown in FIG. 12, it will be seen that the particular supply line is approximately one-half open and when the control discs are arranged as shown in FIG. 13, the fuel line is fully open and the engine can operate at full throttle. While only one cell 50 will be in the exact position shown in FIG. 6 at any one time, it will be appreciated that each end of the arms 42 and 44 are operating relative to one of the cells so that with a plurality of cells as shown, there is a rapid succession of firing from successive cells as the arms rotate.

To accomplish the above operation, it will be noted that the exhaust port 58 leads the intake port 54 in the direction of rotation of arms 42 and 44 and this permits the scoop end 64 of arm 42 to gather as much air as possible and force it into the passageway 52. Thus as soon as port 54 is closed, port 58 also becomes closed causing the air to be compressed and trapped within the cell 50 at which point the fuel is injected and ignited. The expanded gases from the combustion act to effect a rotary motion on shaft 34 and this action takes place on the vanes or fins 72 which cause the rotation of arm 44. As one of the cells 50 is going through this sequence of air charging, fuel injection and ignition, the opposite ends of such arms are preparing another cell 50 for the same sequence of operation. This continuous process provides a constant thrust on the power arm 44 throughout the entire 360° of movement of said arms.

With reference to FIG. 22 we have shown a modification in structure without any change in principle relating to elimination of the two separate arms 42 (FIG. 3) and 44 (FIG. 4) and using instead the single arm 180 keyed to shaft 34 to produce the same results as arms 42 and 44. For this purpose, arm 180 is somewhat C or channel shaped at each end so as to embrace ring 38 as shown and provide closure and opening means 182 similar to FIG. 8 for cooperation with the intake ports 54 and closure and opening means 184 similar to FIG. 9 for cooperation with the exhaust ports 58. The fuel ignitor assembly 128 and spark plug 178 will operate the same as described above but will be on the opposite side of ring 38 to that shown in FIG. 2. This modified arrangement has certain advantages in reduced weight which is an important consideration in certain of its applications.

In FIG. 23 we have further modified FIG. 22 and illustrated the exhaust port 58 in ring 38 on a side adjacent to the side having the intake port 54 and in this arrangement, arm 180' is provided with the curved passageway 186 to receive the exhaust gases from port 58 and direct them downwardly through the casing as shown. In this regard, the corresponding casing portions with FIG. 22 are designated 26' and 28'. It will thus be understood and appreciated that in the use of ring 38 with the internal cells 50, the location of the intake and exhaust ports in the ring may be arranged in a variety of ways without departing from the principle herein disclosed.

From the foregoing it is thought a full understanding of construction and operation of this invention will be had and the advantages of the same will be appreciated.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

We claim:

1. A rotary engine, comprising:
   a housing,
   a circular ring secured within said housing,
   said ring having two opposed flat sides of which one is provided with a plurality of circumferentially spaced intake ports and the other is similarly provided with a like number of exhaust ports,
   a plurality of circumferentially spaced internal cells in said ring,
   each cell in communication with a respective intake and exhaust port by respective intake and exhaust passageways,
   a shaft journalled through said housing for rotation about its longitudinal axis,
   a first arm secured to said shaft for rotation therewith so as to extend radially therefrom with its outer end portion in juxtaposition to said ring for passing successively over said intake ports,
   a second arm similarly secured to said shaft as said first arm for passing successively over said exhaust ports,
   starter means to initially rotate said shaft and said arms,
   the rotation of said arms being synchronized so that air is drawn through an intake port into a cell with both intake and exhaust ports relative to said cell being momentarily closed to effect compression of air in said cell,
   fuel injection and igniting means carried by said housing for explosion in said cell at the moment of air compression,
   said second arm progressively opening said exhaust port whereby the exhaust force powers said second arm and applies a rotary motion to said shaft, and
   said first arm then opens said intake port whereby the continued rotation of said arms repeat said action on the successive cells.

2. An engine as defined in claim 1 wherein said exhaust ports are off-set from said intake ports in a leading direction relative to the direction of rotation of said arms.

3. An engine as defined in claim 1 wherein the outer end of said first arm includes an air scoop means designed to collect a maximum amount of air and direct it into said intake port.

4. An engine as defined in claim 1 wherein the outer end of said second arm includes a plurality of fins against which the exhaust gases act.

5. An engine as defined in claim 1 including:
   a fuel compression chamber,
   a high pressure fuel pump for supplying fuel to said chamber,
   a fuel control means comprising,
   a first fixed plate covering said chamber,
   said first plate having spaced apertures corresponding in number to the number of said cells,
   a second plate secured to said shaft for rotation therewith and in juxtaposition with said first plate so that the aperture in said second plate registers successively with the apertures in said first plate,
   a third plate having spaced apertures as said first plate with said respective apertures in registration,
   said third plate in juxtaposition to said second plate,
   manual control means to rotate said third plate so that the apertures therein can be selectively in partial and full registration or out of registration with the apertures in said first plate to regulate the flow of fuel,
   a casing over said plates including respective fuel receiving chambers in registration respectively with the apertures in said first plate, and
   fuel flow means connecting each fuel receiving chamber in said casing with one of said respective cells.

6. An engine as defined in claim 1 wherein each intake and exhaust passageway is progressively wider from their respective cells to their respective intake and exhaust ports.

7. An engine as defined in claim 1 wherein said fuel injection means includes:
   a nozzle member designed to receive fuel under pressure and disposed to release said fuel in said cell,
   said nozzle including a fuel atomizing chamber and a restricted fuel discharge passageway communication therewith,
   a one way spring loaded ball check valve in said fuel atomizing chamber normally seated to effect closing of said restricted passageway, and
   means directing fuel in said fuel atomizing chamber at least in part against said check valve at the point of intersection with said restricted passageway whereby said valve is slightly unseated to effect atomization of the fuel and its release into said retricted passage for discharge into said cell.

8. A rotary engine, comprising:
   a housing,
   a circular ring secured within said housing,
   said ring being provided with a plurality of circumferentially spaced internal cells,
   said ring being provided with multiple spaced surface openings defining respective pairs of intake and exhaust ports of which each pair of ports communicates with one of said cells,
   a shaft journalled through said housing for rotation about its longitudinal axis,
   means carried by said shaft for movement relative to said ring to progressively close and open each pair of ports successively in a relationship where air is drawn into said intake port and trapped and compressed in said cell by the simultaneous momentarily closing of both ports,
   fuel injection and igniting means carried by said housing for effecting an explosion in said cell at the moment of air compression therein, and
   said means to close and open said port effecting the opening of said exhaust port in advance of the opening of said intake port whereby the force of said explosion is transmitted through said means to rotate said shaft.

9. A rotary engine, comprising:
   a housing,
   a circular ring secured within said housing,
   said ring being provided with a plurality of circumferentially spaced internal cells,
   said ring being provided with multiple spaced surface openings defining respective pairs of intake and exhaust ports of which each pair of ports communicates with one of said cells,
   a shaft journalled through said housing for rotation about its longitudinal axis,
   air scoop means carried by said shaft to move relative to said intake ports for gathering and directing air into said ports and for progressively closing and opening said ports,
   closure means carried by said shaft to move relative to said exhaust ports to progressively close and open said ports in cooperation with said air scoop means whereby air is drawn into said intake port and trapped and compressed in said cell by the simultaneous momentarily closing of both ports, fuel injection and igniting means carried by said housing for effecting an explosion in said cell at the moment of air compression therein, said closure means acting to open said exhaust port in advance of the opening of said intake port by said air scoop means whereby the force of explosion is exhausted, and fins on a portion of said closing means to intercept the force of explosion and impart rotary motion to said shaft.

10. An engine as defined in claim 9 wherein said exhaust ports are off-set from said intake ports in a leading direction relative to the direction of rotation of said air scoop means and said closure means.

11. An engine as defined in claim 9 wherein, respective intake and exhaust passageways connect each cell to a respective intake and exhaust port, and each intake and exhaust passageway is progressively wider from said cell to said respective intake and exhaust ports.

References Cited

UNITED STATES PATENTS 1,240,366    9/1917    Rasmusen _____ 60—39.76 XR

FOREIGN PATENTS 166,611    7/1921    Great Britain.

JULIUS E. WEST, *Primary Examiner.*